Oct. 31, 1961   D. B. STICKNEY ET AL   3,006,052
INSTRUMENT ATTACHING DEVICE
Filed Jan. 13, 1959
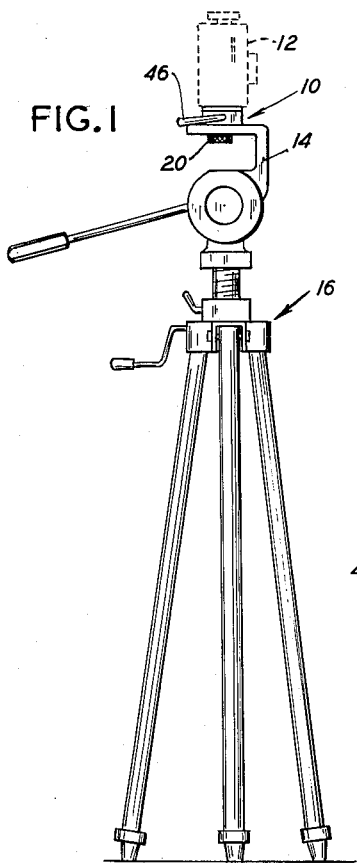
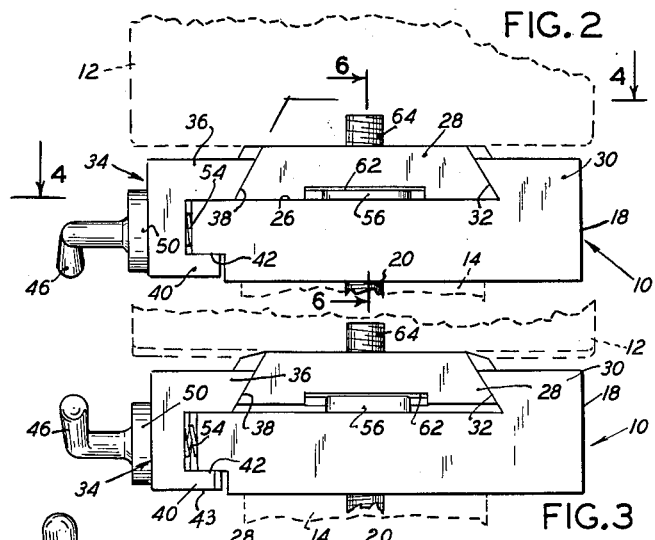
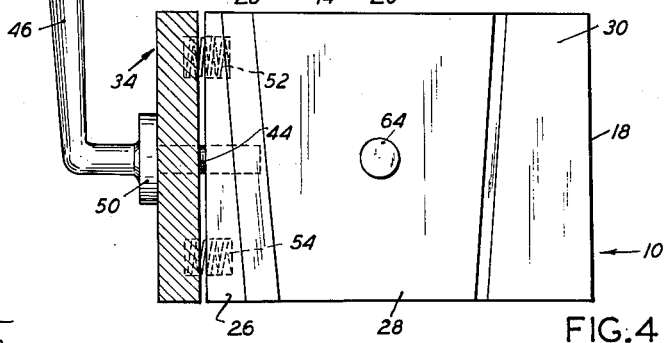
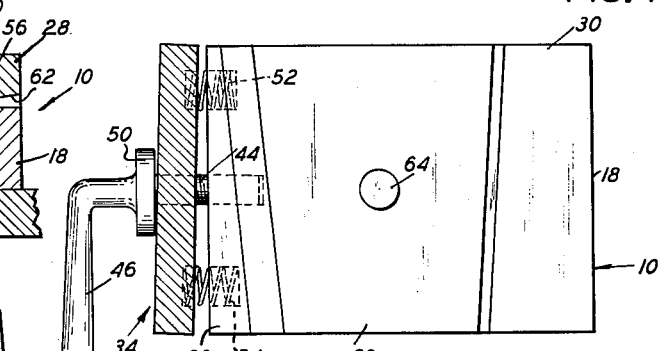
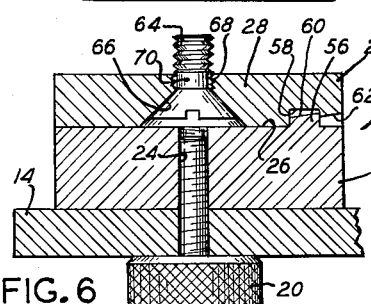
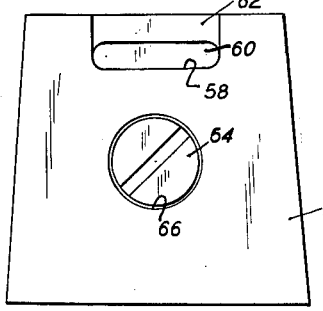
INVENTORS.
DONALD B. STICKNEY
DONALD B. STICKNEY JR.
BY
BUCKHORN, CHEATHAM & BLORE
ATTORNEYS

United States Patent Office 3,006,052
Patented Oct. 31, 1961

3,006,052
INSTRUMENT ATTACHING DEVICE
Donald B. Stickney, Portland, Oreg. (Box 415, Enterprise, Oreg.), and Donald B. Stickney, Jr., Portland, Oreg. (3100 Morris Ave., Corvallis, Oreg.)
Filed Jan. 13, 1959, Ser. No. 786,537
5 Claims. (Cl. 24—263)

This invention relates to an instrument attaching device and more particularly to a device for securing and attaching an instrument such as a camera to a support such as a tripod, while at the same time providing for substantially instantaneous release of the instrument from the support.

Various types of instrument attachment devices have been commercially employed. Many of them include two detachably connected members with a longitudinally tapered dovetail element on one of the members and a cooperating dovetail slot on the other. In general, such devices rely upon frictional engagement produced by wedging the tapered dovetail element into the dovetail groove by a motion longitudinally of such members. With such devices considerable force exerted on the members is ordinarily necessary to produce the wedging action referred to and equivalent or greater force required to disconnect such members from each other. Even so the two members of the attachment device frequently become detached from each other in use, particularly under conditions of vibration.

In accordance with the present invention, an attaching device is provided in which a member having a longitudinally tapered dovetail slot is provided with one edge portion in the form of a clamping element movable with respect to the body portion of such member so as to enable the width of the slot to be varied. This provides for clamping of a tapered dovetail member in the slot, a clamp actuating element being employed to move the clamping element to clamping position. Upon the release of such clamp actuating element to release the clamping element from clamping engagement with the dovetail member, such dovetail member can be easily withdrawn from or inserted into the dovetail slot through the wider end of such slot. The two edge portions of the groove thus constitute movable and stationary clamping portions respectively. Upon actuation of the clamp actuating element to narrow the dovetail slot between each clamping portion, the dovetail member is securely held in the slot.

In a preferred construction, a stop is provided for limiting the movement of the dovetail member longitudinally into the slot so as to enable the dovetail member to always be positioned in the same position relative to the other member. Preferably this takes the form of a projection upon one of the members extending generally normal to the bottom surface of the slot and a cooperating recess in the other member for receiving such projection. In order to slide the dovetail member out of the slot, such dovetail member must be moved upwardly in the slot away from the surface referred to to remove the projection from the recess. Preferably the recess and cooperating projection are adjacent the narrow end of the dovetail member so that only the narrow end of such member need be moved upwardly with respect to the bottom of the slot. This can be accomplished by slightly tilting the instrument attached to one of the members relative to the support for the other member in a direction toward the wider portion of the slot.

The clamping element referred to is preferably moved laterally away from the clamping portion on the other side of the slot by resilient means upon release of the clamp actuating element. Preferably such resilient means is constructed to move the end of the clamping element adjacent the narrow end of the slot away from the body portion of the dovetail member at a greater rate than the other end of the clamping element. This enables the tilting referred to above with a lesser total movement of the clamping element away from such body portion.

It is therefore an object of the present invention to provide an improved instrument attaching device in which two members for attachment to an instrument and a support respectively can be quickly and easily detached from each other upon release of a clamping element and can also be readily attached to each other and securely clamped in predetermined position with respect to each other.

Another object of the invention is to provide an instrument attaching device by which an instrument holding member may be readily detached and attached to a base member and in which one of such members provides a longitudinally tapered dovetail slot which can be widened and narrowed by actuation of a clamp actuating element to releasably clamp a dovetail member received in such slot.

Another object of the invention is to provide an ininstrument attaching device in which a dovetail member is securely clamped in a dovetail slot and held therein against movement longitudinally of such slot by interengaging locking elements releasable by a motion of a portion of such dovetail upwardly in the slot and then longitudinally out of the end of such slot.

Other objects and advantages of the invention will appear in the following description of a preferred embodiment of the invention shown in the attached drawing, of which:

FIG. 1 is a side elevation showing the instrument attaching device of the present invention mounted on a tripod and holding a camera, shown in dotted lines, in position on the tripod.

FIG. 2 is a front elevation of the instrument attaching device of the present invention on an enlarged scale with portions of the camera and the tripod of FIG. 1 shown in dotted lines and with the instrument holding member of the device clamped in position on the base member;

FIG. 3 is a view similar to FIG. 2 with the instrument holding member of the device in released position for sliding longitudinally out of the dovetail slot in the base member;

FIG. 4 is a view partially in plan and partially in horizontal section on the line 4—4 of FIG. 2, showing the clamping element in clamping position with respect to the instrument holding member;

FIG. 5 is a view similar to FIG. 4, showing the clamping element in released position with respect to the instrument holding member;

FIG. 6 is a vertical longitudinal section through the device taken on the line 6—6 of FIG. 2; and FIG. 7 is a bottom view of the instrument holding member.

Referring more particularly to the drawings, the instrument attaching device of the present invention is shown at 10 in FIG. 1 as holding an instrument, such as a camera 12, on a support, such as the swivel member 14 of a tripod 16. The instrument attaching device includes a base member 18 (FIGS. 2 and 3) which may be attached to the support 14 by any suitable means, such as a screw 20 (FIGS. 1 and 6) having an enlarged knurled head and a shank portion extending through an aperture in the support member 14 and into a screw-threaded aperture 24 in the base member 18. The base member 18 and the support 14 preferably have engaging flat surfaces and such flat surface on the base member is preferably knurled (not shown) for better frictional engagement.

As shown most clearly in FIGS. 2 to 5, the base member 18 has an upper surface 26 for receiving and supporting a longitudinally tapered dovetail instrument holding member 28. The base member 18 has a longitudinally tapered clamping portion 30 along one of its side edges extending in a direction generally normally of the surface 26, such clamping portion 30 having its inner edge 32 undercut to provide one edge of a longitudinally tapered dovetail slot receiving the dovetail member 28. The other side of the dovetail slot is provided by a clamping element 34 also providing a longitudinally tapered clamping portion 36 along the other edge of the base member 18. The clamping portion 36 of the clamping element 34 also has inner edge 38 which is undercut to provide the other edge of the longitudinally tapered dovetail slot. The clamping element 34 is preferably of generally U-shaped form as shown in FIGS. 2 and 3 and has one leg forming portion 36 in guiding engagement with the surface 26 of the base member. A lower leg 40 of the U-shaped clamping element has sliding engagement with a guide surface 42 formed on the base member so that the U-shaped clamping element 34 embraces a laterally extending guiding portion 42 of the base member 18. It will be understood that the surfaces 26 and 42 will be parallel to each other and that the cooperating surfaces on the inner portions of the legs 36 and 40 of the U-shaped clamping element engage the surfaces 26 and 42 in sliding relationship. The lower surface 43 of the leg 40 is relieved so as to be somewhat above the surface of the base member in contact with the support 14 to provide clearance for lateral sliding motion of the clamping element 34.

The clamping element 34 is moved laterally of the base member 18 toward the clamping portion 30 thereof by a screw-threaded clamp actuating element 44 having a handle portion 46 extending generally at right angles to its body portion. The screw-threaded element 44 extends through an aperture in the clamping element 34 and is screw-threaded into the guiding portion 42 of the base member 18. The screw-threaded element 44 has a collar portion 50 engaging the external lateral surface of the clamping element 34 and it will be apparent that rotation of the screw-threaded element 44 by the handle 46 in one direction will move the clamping element 34 toward the base member 18 so as to move the clamping portion 36 thereof laterally toward the clamping portion 30 of the base member to decrease the width of the dovetail slot formed between the clamping portions 36 and 30.

The screw-threaded element 44 preferably is positioned approximately midway of the length of the clamping element 34 and the clamping element is resiliently urged away from the base member 18 by a pair of compression springs 52 and 54 positioned in suitable guiding apertures in the base member 18 and the clamping element 34. Such springs are located adjacent the ends of the clamping element 34 and the spring 54 adjacent the narrow end of the dovetail instrument holding member 28 is preferably of substantially greater spring force than the spring 52 adjacent the wider end of the dovetail portion 28 of the instrument holding member. Upon rotation of the screw-threaded member 44 in the releasing direction, the springs 52 and 54 move the clamping element 34 away from the base member 18. The stronger spring 54, as shown in FIG. 5, causes a greater movement of the end of the clamping element adjacent the narrow end of the instrument holding member 28 than the other end of the clamping element. This facilitates removal of the instrument holding member 28 from the dovetail slot provided by the base member and clamping element 34 as will be described in more detail below.

The instrument holding member 28 is inserted into the dovetail slot when the clamping element 34 is in the release position, shown in FIGS. 3 and 5, by a movement longitudinally of the slot from the wider end of the slot toward the narrow end of the slot. In order to provide for always positioning the instrument holding member 28 in a predetermined relative position with respect to the base member 18 and for securely holding such holding member in such position, the surface 26 of the base member 18, as most clearly shown in FIG. 6, is provided with an upwardly extending projection 56 received in and fitting a recess 58 in the instrument holding member. The end surface 60 of the projection 56 is preferably inclined toward the surface 26 in a direction toward the wider end of the slot. Also the narrow end of the dovetail member 28 in alignment with the projection 56 is formed to provide a surface 62 similarly inclined toward the surface 26 in a direction toward the wider end of the dovetail member 28. It will be apparent that the surfaces 60 and 62 provide cooperating cam surfaces so that sliding of the dovetail member 28 into the dovetail slot from the wider end thereof will cause the narrow end of the dovetail member to be cammed upwardly over the projection 56. Further sliding motion of the dovetail member causes the projection 56 to be aligned with the recess 58. Such projection is then engaged in the recess 58 by a movement of the dovetail member 28 toward the surface 26. The projection 56 and recess 58 form a stop against sliding of the dovetail member 28 in either direction longitudinally of the slot so as to accurately position it upon the base member 18.

Upon tightening the clamping element 34 against the base member 18 by the screw-threaded clamp actuating element 44, the dovetail instrument holding member 28 is pressed downwardly against the surface 26 and is rigidly held in position. Upon loosening of the clamp actuating element 44, the end of the clamping element 34 adjacent the narrow end of the instrument holding member 28 moves away from the base member 18 so that the narrow end of the instrument holding member 28 can be raised to the tilted position indicated in FIG. 3. The surface 62 clears the projection 56 and the instrument holding member 28 may then be slid rearwardly out of the dovetail slot. A third of a turn or less of the screw-threaded element 44 is, in general, sufficient to release the clamping action and enable removal of the instrument holding member 28 from the base member 18.

The instrument holding member may be attached to the camera 12 or other instrument in any suitable manner, for example, by a screw 64 having a conical head fitting in a conical recess 66 in the instrument holding member 28 and extending through a short screw-threaded bore 68 and having its end projecting from such member for screwing into an instrument to be attached thereto. The screw has a short annularly grooved portion 70 registering with the screw threads in the bore 68 when the screw is installed in the instrument holding member 28. It will be apparent that the screw 64 may be screw-threaded into the position shown in FIG. 5 and that it can be rotated farther in the screw advancing position after reaching the position shown in FIG. 5 by reason of the annular groove 70 registering with the threads in the bore 68. This provides for attaching a camera or other instrument to the instrument holding member 28 by employing a screwdriver or coin with the instrument holding member 28 removed from the base member 18.

In operation, the instrument holding member 28 is attached to a camera or other instrument by the screw 64 as just described. Also, the base member 18 is attached to a support, such as a swivel member 14, by any suitable attaching element, such as the screw 20. With the element 34 in the released position shown in FIGS. 3 and 5, the instrument having the instrument holding member 28 attached thereto is held so that the small end of the dovetail member 28 is positioned to be inserted into the wide end of the dovetail slot formed between the clamping portions 30 and 36 on the base member 18. The instrument holding member 28 is advanced into such slot and the surface 62 at its forward end cams such forward end over the projection 56 on the base member 18. The projection then enters the recess 58 to accurately position the instrument holding member 28 on the base member 18. The screw-threaded element 44 is then rotated approximately a third turn in the tightening direction to force the clamping element 34 toward the clamping portion 30 of the base member 18 to clamp the instrument holding member 28 rigidly in position. Upon rotating the screw-threaded member 44 in a reverse direction approximately a half a turn, the end of the clamping element 34 adjacent the small end of the instrument holding member 28 first moves out to the position shown in FIGS. 3 and 5 by reason of the spring 54 having greater spring force than the spring 52. The instrument carried by the instrument holding member 28 is then tilted slightly in a rearward direction to move the small end of the instrument holding member 28 away from the surface 26, as shown in FIG. 3, so as to cause the instrument holding recess in the instrument holding member 28 to move away from the projection 56, thus enabling rearward movement of the instrument holding member 28 out of the dovetail slot. The necessary tilting action enabling rearward movement of the instrument holding member out of the base member is instinctive since rearward pressure on the instrument tends to tilt it rearwardly. The instrument attaching device of the present invention thus provides for the rapid and easy installation of an instrument upon a support and for securely holding such instrument in an accurately predetermined position on such support while, at the same time, providing for the rapid and easy removal of such instrument from such support. It will be understood that a plurality of instruments may be provided with instrument holding members in accordance with the present invention for interchangeable mounting on the same support or that a plurality of supports can be provided with base members so as to enable an instrument to be mounted selectively upon two or more supports.

While we have disclosed preferred embodiments of our invention, it is to be understood that the details thereof may be varied and that the scope of the invention is to be determined by the following claims.

We claim:

1. An instrument attaching device comprising a base member for attachment to a support, an instrument holding member for attachment to an instrument and a clamping element carried by said base member, said base member and said clamping element having cooperating clamping portions defining the sides of a dovetail slot, said dovetail slot being tapered in a direction longitudinally of said slot, said clamping element being movable on said base member laterally of said slot between a release position and a clamping position, said instrument holding member providing a longitudinally tapered dovetail portion fitting said slot when said clamping member is in said clamping position, and means for moving said clamping element between said release position and said clamping position for clamping said dovetail portion in said slot and for releasing said clamping element to enable sliding of said dovetail portion longitudinally out of said slot, said base and holding members having interlocking portions comprising a transverse projection on one and a closely fitting transverse slot on the other for holding said dovetail portion in a predetermined position longitudinally of said slot when said dovetail portion is clamped in said slot, said base and holding members having cooperating cam portions adjacent said interlocking portions for separating said interlocking portions in a direction normal to said slot upon longitudinal entry of said holding member into said dovetail slot whereby said projection may enter said transverse slot, and said interlocking portion being releasable by manual movement of said dovetail portion in a direction normal to the longitudinal axis of said slot when said clamping element is in said release position.

2. An instrument attaching device comprising a base member for attachment to a support, an instrument holding member for attachment to an instrument and a clamping element carried by said base member, said base member and said clamping element having cooperating clamping portions defining the sides of a dovetail slot, said dovetail slot being tapered in a direction longitudinally of said slot, said clamping element being movable on said base member laterally of said slot between a release position and a claming position, said instrument holding member providing a longitudinally tapered dovetail portion fitting said slot when said clamping member is in said clamping position, screw means for moving said clamping element between said release position and said clamping position for clamping said dovetail portion in said slot and for releasing said clamping element to enable sliding of said dovetail portion longitudinally out of said slot, said members having interlocking projecting and recessed portions adjacent the small end of said tapered dovetail portion releasable from each other by manual movement of said small end away from the bottom of said slot when said clamping element is in release position, and resilient means comprising a spring compressible between said members by said screw means for moving the end of said clamping element adjacent said small end away from said small end upon release of said clamping element to facilitate manual release of said interlocking portions.

3. An instrument attaching device comprising a base member for attachment to a support, an instrument holding member for attachment to an instrument and a clamping element carried by said base member, said base member and said clamping element having cooperating clamping portions defining the sides of a dovetail slot having a surface between said clamping portions for receiving and supporting said instrument holding member, said slot being tapered in a direction longitudinally of said slot, said clamping element being movable on said base member laterally of said slot between a clamping position and a release position, said instrument holding member providing a longitudinally tapered dovetail portion fitting said slot when said clamping element is in clamping position, screw means centrally of said clamping element for moving said clamping element to said clamping position to clamp said dovetail portion in said slot, resilient means at each end of said clamping element for moving said clamping element away from said dovetail portion to said release position when said clamping means is released to provide for sliding of said dovetail portion longitudinally out of said slot, said members having interlocking means comprising a transverse projection on one and a transverse slot on the other releasable by manual movement of said dovetail portion away from said surface to enable sliding of said of said dovetail portion longitudinally out of said slot, said interlocking means being adjacent the narrow end of said slot, said resilient means comprising a pair of springs of unequal strength arranged to move the end of said claming element adjacent said narrow end away from said dovetail portion at a greater rate than the other end of said clamping element to facilitate manually releasing said interlocking portions.

4. An instrument attaching device comprising a base member for attachment to a support, an instrument holding member for attachment to an instrument, said base member having a surface for receiving said holding member and having a first clamping portion extending along one side edge of said surface and projecting outwardly from said surface, a clamping element carried by said base member adjacent the opposite side edge of said surface, said clamping element being slidable on said base member for lateral movement with respect to said base portion toward and away from said first clamping portion, said clamping element providing a clamping portion extending along said opposite edge of said surface, said clamping portions having faces directed toward each other and having said faces undercut and converging along lines parallel to said surface to provide a dovetail groove tapering in width, said instrument holding member providing a dovetail portion tapering in width and fitting in said dovetail groove, clamping means extending centrally through said clamping element and screw-threaded into said base member for moving said clamping element toward said first clamping portion to clamp said instrument holding portion in position on said base member, and resilient means comprising a pair of transverse springs biasing each end of said clamping element away from said base for moving said clamping element away from said first clamping portion to release said dovetail portion for sliding movement longitudinally out of said slot, one of said springs being stronger than the other.

5. An instrument attaching device comprising a base member for attachment to a support, an instrument holding member for attachment to an instrument, said base member having a surface for receiving said holding member and having a first clamping portion extending along one side edge of said surface and projecting outwardly form said surface, a clamping element carried by said base member adjacent the opposite side edge of said surface, said clamping element being guided on said base member for lateral sliding movement with respect to said base portion toward and away from said first clamping portion, said clamping element providing a clamping portion extending along said opposite edge of said surface and projecting outwardly from said surface, said claming portions having faces directed toward each other and having said faces undercut and converging along lines parallel to said surface to provide a dovetail groove tapering in width, said instrument holding member providing a dovetail portion tapering in width and fitting in said dovetail groove and having a surface engaging said surface of said base member, clamping means extending transversely through the longitudinal midportion of said clamping element and screw-threaded into said base member for moving said clamping element toward said first clamping portion to clamp said instrument holding portion in position on said base member, and resilient means comprising a spring adjacent each end of said clamping element for moving said clamping element away from said first clamping portion to release said dovetail portion for sliding movement longitudinally out of said slot, one of said surfaces having a transverse projection and the other of said surfaces having a transverse recess receiving said projection to prevent such sliding movement, said projection being released from said recess by relative movement of said surfaces away from each other, said projection and recess being adjacent the narrow end of said dovetail slot and said other surface having a cam portion adjacent said recess engaging said projection during sliding movement of said dovetail portion longitudinally into said slot to cause relative movement of said surfaces away from each other and said other surface to slide over said projection, and the one of said springs adjacent the narrow end of said dovetail slot being stronger than the other whereby to move the end of said clamping element adjacent said narrow end away from said first clamping portion at a greater rate than the other end of said clamping element to facilitate releasing of said projection from said recess during movement of said dovetail portion out of said slot and also facilitating movement of said dovetail portion into said slot.

References Cited in the file of this patent

UNITED STATES PATENTS

| | | |
|---|---|---|
| 461,998 | Coombs | Oct. 27, 1891 |
| 1,027,941 | Viezzi | May 28, 1912 |
| 1,400,491 | Mechling | Dec. 13, 1921 |
| 1,473,504 | Neely | Nov. 6, 1923 |
| 2,615,664 | Reeves | Oct. 28, 1952 |
| 2,791,950 | Oppenheimer | May 14, 1957 |

FOREIGN PATENTS

| | | |
|---|---|---|
| 483,131 | Great Britain | Apr. 12, 1938 |